Dec. 10, 1929.   G. B. STEAD   1,739,379
MACHINE FOR MAKING TILE
Filed July 19, 1927   6 Sheets-Sheet 1

Dec. 10, 1929. G. B. STEAD 1,739,379
MACHINE FOR MAKING TILE
Filed July 19, 1927   6 Sheets-Sheet 2

Fig. 9. PRESSING

Fig. 10. AUTOMATIC TROWLING AND RELEASING

Fig. 11. REVERSING

Fig. 12. TO DRYING ROOM

Fig. 13.

INVENTOR
George B. Stead.
BY Munn & Co.
ATTORNEYS.

Dec. 10, 1929.  G. B. STEAD  1,739,379
MACHINE FOR MAKING TILE
Filed July 19, 1927    6 Sheets-Sheet 4

INVENTOR
George B. Stead.
BY
ATTORNEYS

Dec. 10, 1929.  G. B. STEAD  1,739,379
MACHINE FOR MAKING TILE
Filed July 19, 1927   6 Sheets-Sheet 5

Fig. 18.

INVENTOR
George B. Stead.
BY
ATTORNEYS

Patented Dec. 10, 1929

1,739,379

UNITED STATES PATENT OFFICE

GEORGE B. STEAD, OF EUGENE, OREGON

MACHINE FOR MAKING TILE

Application filed July 19, 1927. Serial No. 206,932.

This invention relates to the manufacture of art or decorative tiles, blocks, and the like used in building operations, and involves mechanical means with the aid of which they may be conveniently and economically made.

The invention is applicable to the manufacture of the class of tiles used in bath rooms, fire places, flooring, kitchens, etc., as well as to building blocks, etc. and provides such tile, blocks, etc. with a smooth hard surfacing which may be of various colors, mottled, variegated, etc., and which may be matte or gloss. In the making of the tile, the hard smooth surfacing is incorporated or built into the body of the tile or other element which it faces, making a firm union therewith and providing long wearing surface where the latter is subjected to wear, as in the case of floor tiles and similar blocks.

The details and novel features of operation and construction of the invention are set forth in the following specification when read in connection with the accompanying drawings forming part of the specification and illustrating diagrammatically the steps of manufacture, and detailing the structure of mechanical means with the aid of which the tile may be so made.

The practise of tile making as involved herein is characterized generically by the application with molding pressure of a suitable wet backing of cement or other similar material to a facing layer of mixed color and cement previously applied to the face of a highly polished metal plate, the molding pressure being subsequently relieved and the plate and molded tile or other similar article being relatively moved by concussive force, loosening the plate from the tile and automatically effecting a trowelling of the facing surface, the tile and plate being thereafter separated and the tile permitted to set and cure.

The colored material forming the facing in such an operation is formed preferably of cement or other similar "setting" composition with which dry colors, such as oxide colors, are intimately mixed, the proportion of color to cement having a maximum of approximately 10% of the mixture, although in practice approximately 3%—about one-half an ounce of color to 1 pound of cement,—has proven satisfactory, the proportion being varied in accordance with the shade of color which it is desired to obtain.

As shown in the drawings, a predetermined proportion of cement 1 and of color 2 are emptied into a suitable mixing device 3 having a plurality of mixing rolls 4 incorporated therein which operate at differential speeds thereby effecting a thorough intermixing of these ingredients which are discharged by a spout 5 into a suitable receptacle 6. Into this receptacle containing the color mix, just sufficient water is poured as from a container 7 to give the mixture an initial set. This preparation of color is known in the art as a "semi-dry" process. The resultant color is thoroughly mixed by stirring or other appropriate method and is then screened as indicated in Figure 5, a twenty mesh wire screen being preferably employed through which the semi-dry color cement is sifted into a receptacle 9 from which it is removed as needed.

The facing ingredients heretofore described are such as are used to form a smooth glossy facing for the tile or other article. Where matte or other surfacing is to be applied, the mixture is varied accordingly. In the case of matte surfacing, fine sand is added.

In the use of the color mix as a facing for tile or other block, a highly polished steel plate 11 is placed on a mold base 12. This plate is substantially larger than the tile or block to be molded and is covered in part by a mold frame section 14, the inner side edges of which define the sides of the mold. The color mix is applied to the exposed face of this plate in an even layer by means of a suitable tool, such as the spatula 13 shown in Figure 8. Where more than one color is to be used in the facing material, portions of the various colors desired are appropriately manipulated to provide blended mixture giving the color effects desired. For example, as shown in Figure 6, similar quantities of three different colors are placed in a dish 10, the reference character C designating in the drawings the color mix. By resting the spoon or other implement on the top of the mix and giving a quick partial rotation or twirl to the dish, the colors will roll around the edge of the spoon and the resultant color, when spread on the plate 11 by a spatula 13 will present a pleasing mottled color effect. As above stated many variations may be made, one, only, being cited as illustrative.

Figures 1, 2, 3, 4, 5, 6, 7, 8:
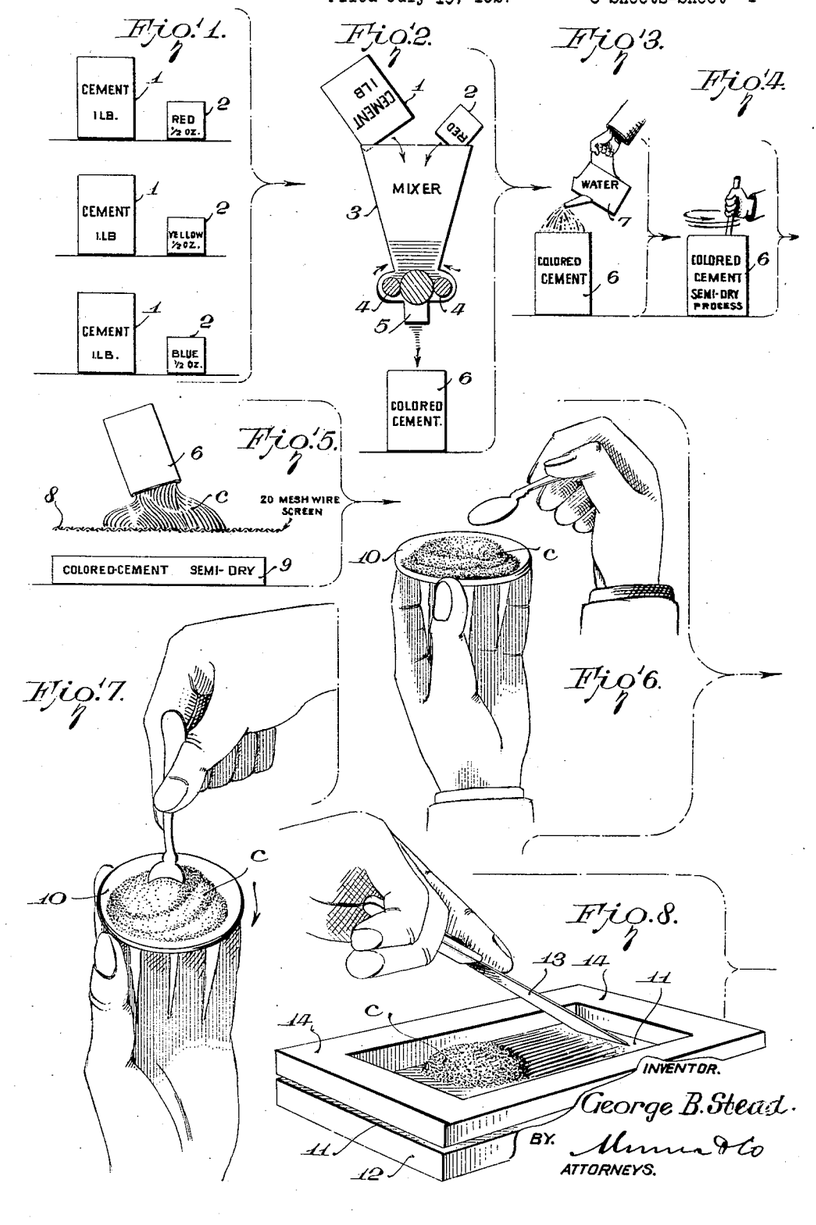
Figures 1-5 illustrate successive steps in the preparation of the colored facing material for the tile or other article.
Figures 6-8 illustrate the manipulation and subsequent application of the facing material to a mold.
Figure 9:
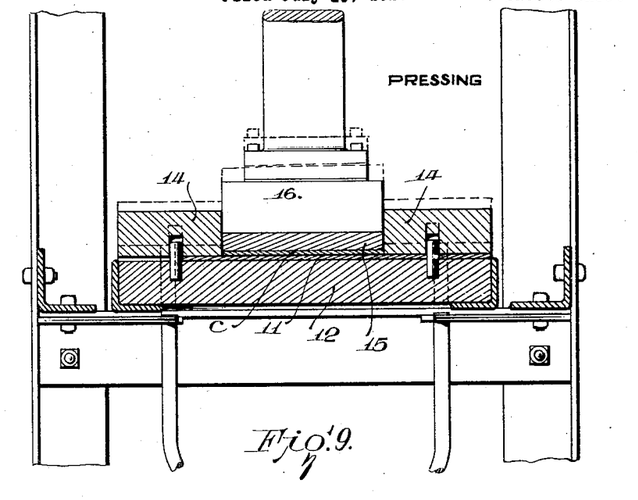
Figure 9 is the sectional view illustrating such a mold with the facing material applied and then covered by a backing or main body of cement mixture and subjected to pressure in a suitable mold or press.

With the color mix thus spread upon the polished metal plate as suggested in Figure 8, the material forming the base or body layer of the tile is now spread over the color mix within the area inclosed by the sides of the mold frame 14. This material ordinarily will consist of cement and sand, wet mixed in appropriate proportions, although it is to be understood that other plastic mixtures may be employed. When the base or backing layer 15 has been applied to the mold, it is compressed in the direction of the underlying color facing C and the polished metal plate 11, by means of a suitable press or plunger 16. The operation of the plunger or press not only serves to form or mold the body of the tile, but by reason of this pressure and the water containing nature of the mass, the color facing C is thoroughly moistened and is compressed into intimate union with the adjacent backing of cement thereby bonding the facing into the body of the tile. The outer face of the color mix by reason of pressure against the highly polished metal plate 11 acquires a firm smooth surface which is improved and finished by the semi-automatic trowelling action which occurs in the mixing step of the process.

Figure 10:
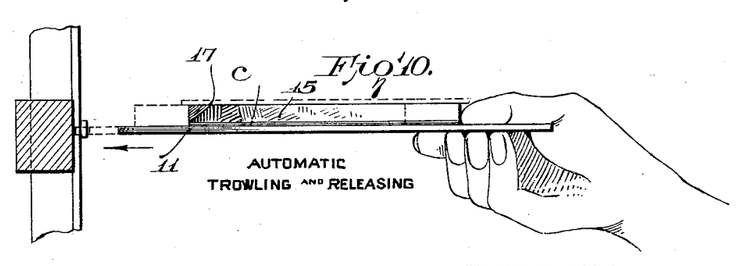
Figure 10 illustrates the molded tile removed from the press on its polished metal plate and in the process of receiving concussive force to loosen the molded tile from its plate and to effect through the latter, automatic trowelling action.
Figures 11, 12, 13:
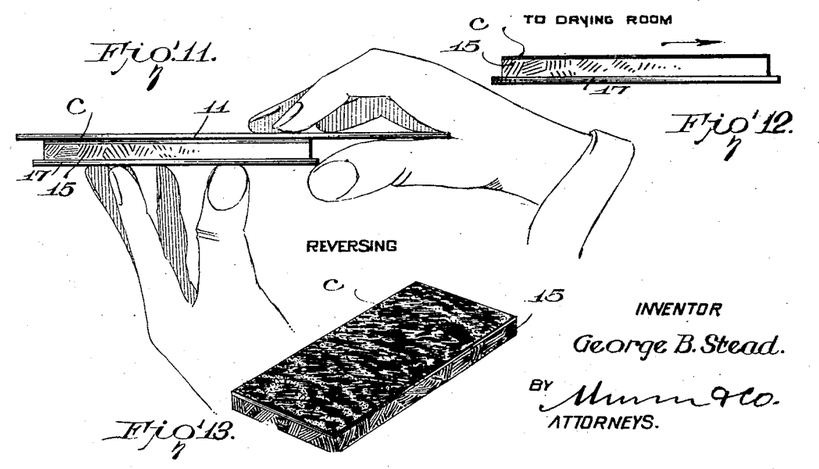
Figure 11 illustrates the released tile in reversed position on a supporting plate and with the polished molding plate in the process of removal.
Figure 12 illustrates the step of final drying or setting of the material so molded.
Figure 13 is a perspective view of a finished tile.
Figure 14:
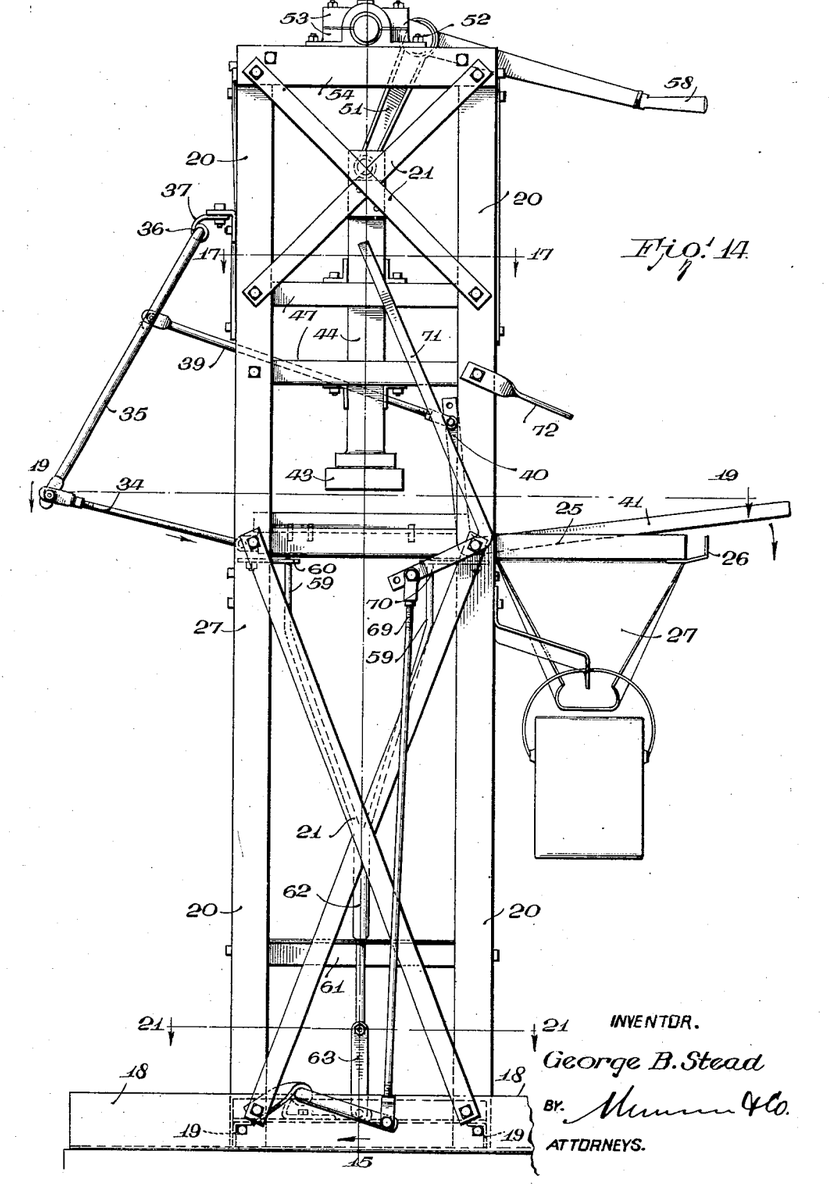
Figure 14 is a view in side elevation of a molding press constructed in accordance with the present invention.

When the press has exerted adequate pressure against the tile, the compressing plunger 16 and the mold sides 14 are lifted, exposing the molded tile resting upon the plate 11, the latter is now grasped and the plate and tile removed from the mold. In this condition, the tile normally adheres to the plate. By giving the edge of the plate a sharp bunt against a suitable stationary abutment, such as a block of wood secured to the frame of the mold as suggested in Figure 10, the concussive force imparted by the blow will cause the molded tile to slide relatively to the plate, this sliding movement imparting an automatic trowelling action to the facing through the plate and loosening the plate from the face of the tile. This having been accomplished, a suitable support, such a glass plate 17 is applied to the back face of the tile and with one hand engaging this plate 17, the tile is inverted to the position shown in Figure 11 and the polished plate 11 removed, after which the tile is carried on its support to the drying room where it sets and becomes cured. If a higher polishing than that imparted to the tile face by the described process is desired, the tile when cured is given a coating of liquid wax and buffed with a high speed brush.

Tile so made, while intended primarily for use in so-called art or decorative, bath room and fire place or flooring tiles may also be used as faced building blocks or even brick. The facing material may not only be made of cement, but any material that can be worked in a semi-dry state, and is set similarly to cement.

Figure 18:
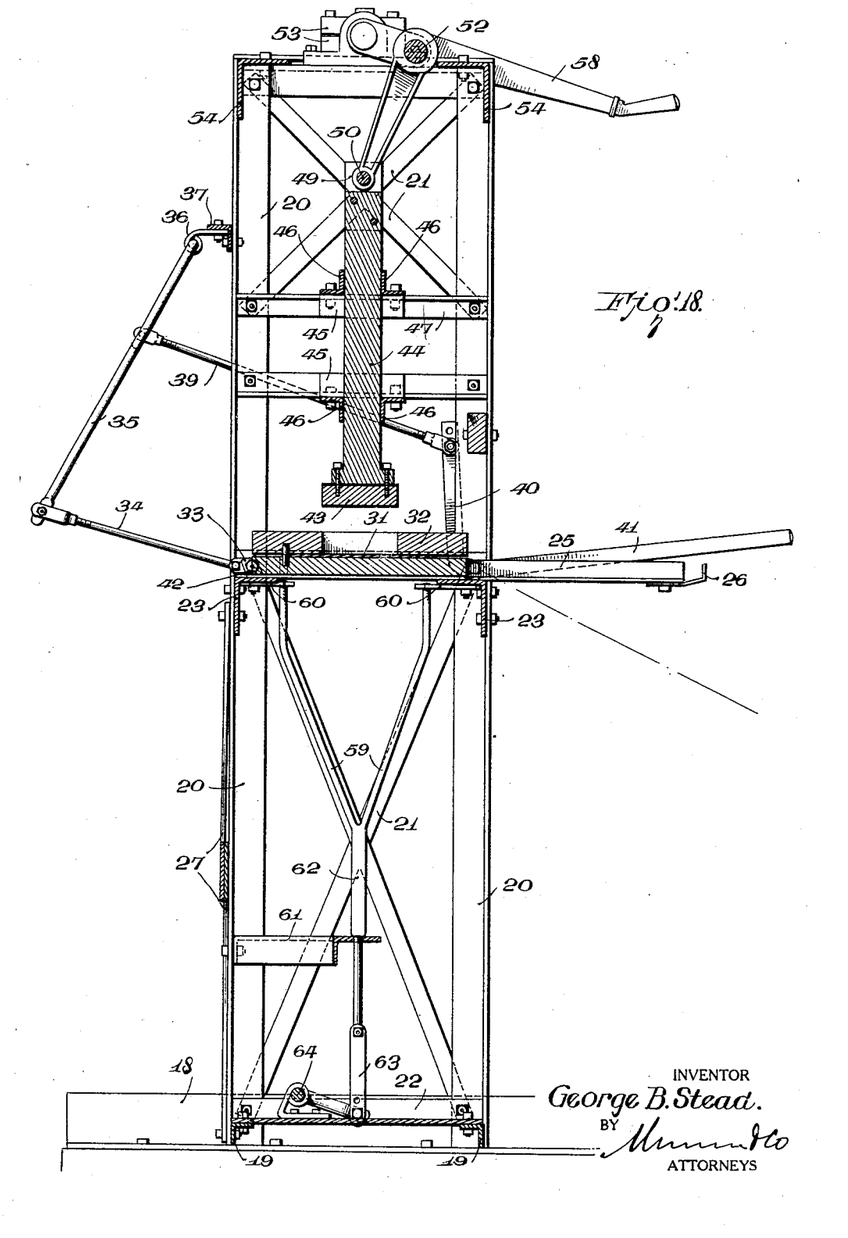
Figure 18 is a vertical section through the molding press with the parts in the position shown in Figure 15.
Figures 19, 20:
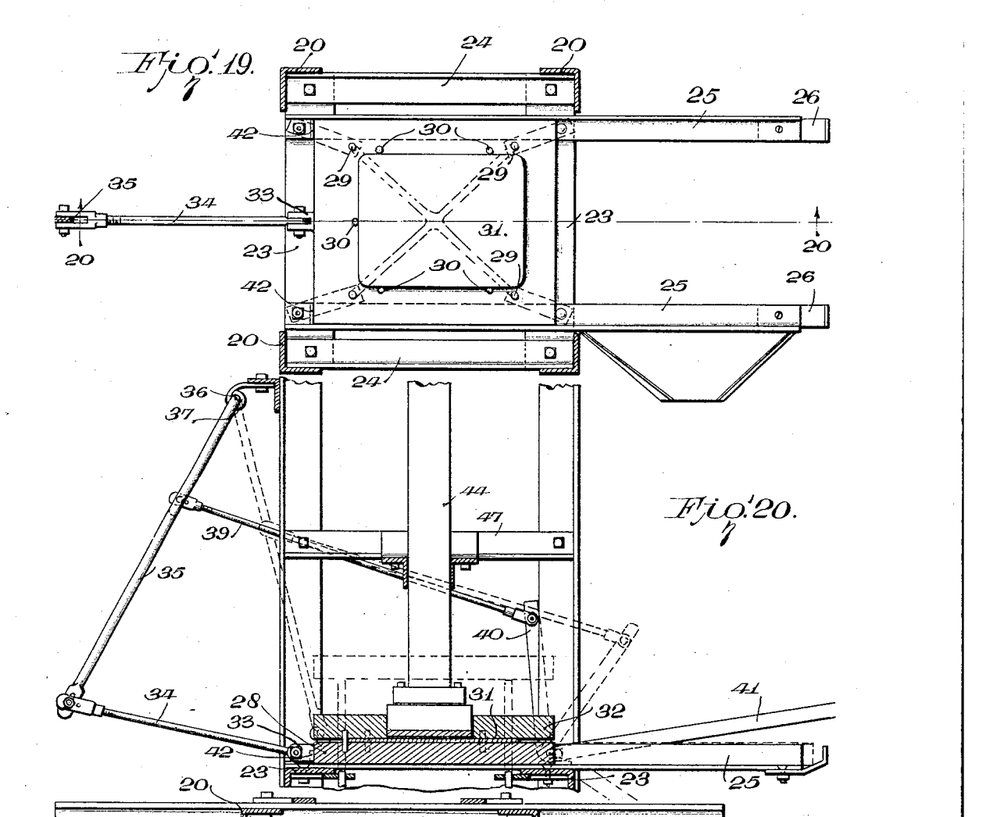
Figure 19 is a horizontal section taken on the line 19—19 of Figure 14.
Figure 20 is a fragmentary vertical section on the line 20—20 of Figure 19.
Figure 21:
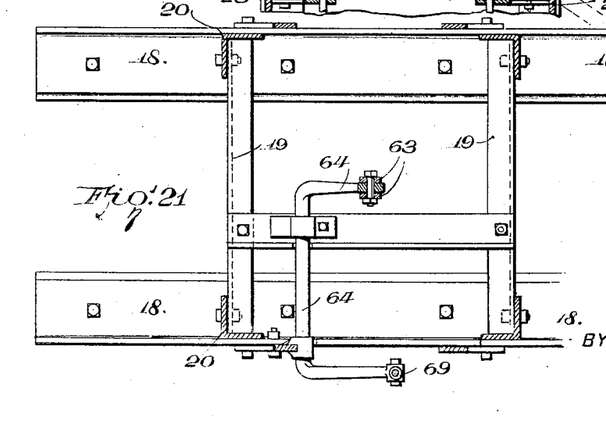
Figure 21 is a horizontal section taken on the line 21—21 of Figure 14.

A manually operable press or mold with the aid of which tiles and other similar blocks having the described characteristics, may be molded, is shown in Figures 14–21 of the drawings. Briefly, it consists of a plunger mounted in a frame for reciprocating movement and a mold including a base to receive the polished metal facing plate and a side section superposed over the plate and guided relatively to the base for movement toward and from the base, the latter being mounted for movement from and to a determinate position in alinement with the plunger, so that the material in the mold may receive pressure therefrom. Means is provided for supporting the base in withdrawn position to enable the mold to be filled with the plastic material forming the block or tile. Additionally, means is also provided for effecting a movement of the side section of the mold relatively to its base after the completion of the molding operation to permit the molded tile to be withdrawn from the base. Various structural advantages and features will be noted from the following description:

The horizontal base of the supporting frame for the apparatus may be formed by spaced parallel angle irons 18 having lower horizontal flanges or faces bolted to a suitable base and having connected to their vertical flanges, opposed pairs of angle iron risers 20 bolted to these flanges and cross-connected by base angles 19, Figures 18 and 21, these pairs of risers having suitable cross bracing 21 at the sides and back interrupted at the upper portion of the frame to provide space for operating levers to be later described. From the front to the rear of the machine and between the pairs of risers 20, the base angles 19 are connected by a similar angle 22.

At a point substantially midway of the frame and extending transversely of the frame from one of a pair of risers to the opposed riser of the other pair are connecting angle irons 23 (Fig. 18) upon which rest smaller angles 24 bolted to and interconnecting the risers of each pair. Within these last named angles 24 which extend from front to rear of the machine, a pair of angle iron guides 25 are bolted to the angles 23 and extend outwardly from the frame and have stop lugs 26 (Fig. 19) attached to their outer ends and are provided with an underlying trough 27. These guide ways receive the mold proper which is designed to be moved in the guides 25 from a point beyond and forwardly of the frame to which these guides extend inwardly to a determinate position in line with a plunger which is supported above the mold and reciprocates toward and from the same.

The mold which comprises a base plate 28 having a plurality of vertical mold separating apertures 29 therein, seats upon the guide rails 25 and is provided with a plurality of upstanding pins 30 acting as edge positioning guides or stops for the highly polished metal plate 31 which reposes upon the base 28 and acts as the face of the mold. The mold separating apertures 29 are located beyond the outer edges of this plate. Seated over the plate 31 and over the base mold 28 are the side mold sections 32 which may be of any desired configuration depending upon the size and shape of the article to be molded and which is provided on its under face with sockets by means of which it is guided by the pins 30 in being positioned on the base of the mold. From the rear of the mold base 28, spaced ears 33 project and embrace the forward end of a link rod 34, the rearward bifurcated end of which embraces the lower end of a rock arm 35 bent at right angles to form a rock shaft 36 journalled in hangers 37 supported from suitable angles at the back of the frame. The rod forming the rock shaft 36 is again bent at a point beyond the edge of the frame to provide a downwardly extending arm 38. The lower end of this arm is connected by a pivot link 39 extending forwardly to and pivotally secured to one end 40 of a bell crank lever, the other end 41 of which forms an operating lever by means of which the mold may be moved forward for filling and reversely to molding or pressure receiving position within the frame. In the movement of the mold to pressure receiving position, its rear edge engages stops 42 (Figs. 19 and 20) which determinately position the mold in opposed relation to the plunger which applies molding pressure.

Figures 15, 16, 17:
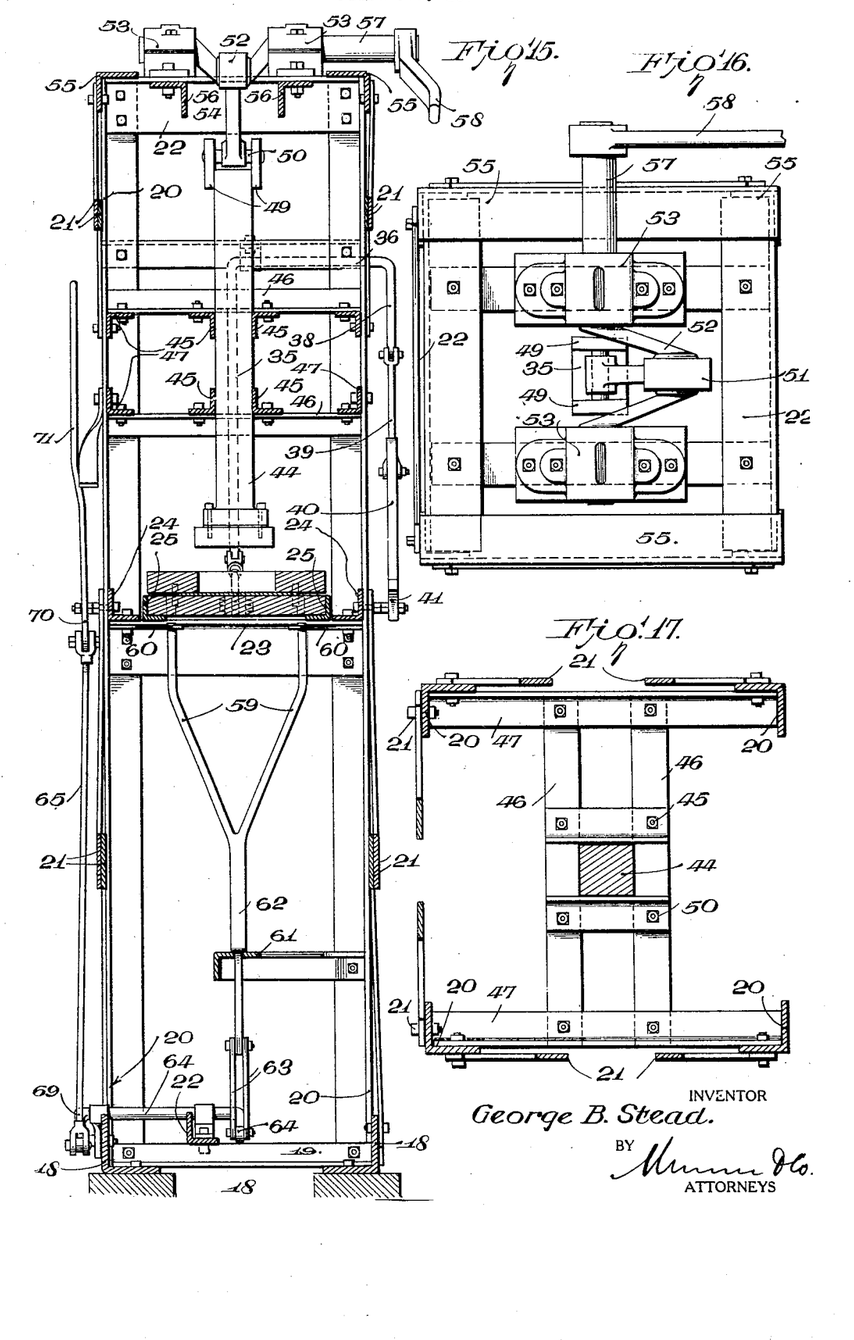
Figure 15 is a vertical section taken through the press shown in Figure 14 on the line 15—15 thereof.
Figure 16 is a top plan view of the press shown in Figure 14.
Figure 17 is a transverse section on the line 17—17 of Figure 14.

This plunger 43 which in contour will correspond to that outlined by the inner edges of the mold side section 32, (these two cooperating in the manner of a male and female die) is carried at the lower end of a vertically reciprocating plunger 44 guided for rectilinear movement by guides 45 (Fig. 17) formed as short angle irons embracing opposite sides of the square plunger 44 and connected, as best seen in Figures 15, 17 and 18, to angle bars 46 which embrace the opposite sides of the square plunger and are in turn connected at their ends to the angle bar braces 47 extending from front to rear of the frame and interconnecting the risers 20.

The upper end of the plunger 44 is embraced by spaced plates 49 seating the ends of a wrist pin 50 on which is journalled the lower end of a connecting rod 51 mounted upon the short crank shaft 52, the bearings 53 of which are mounted on top of the mold frame which at this point is suitably cross braced by angles 54 with side braces 55 overlying the top of the frame and cross braces 54. To properly support the bearings 53, angles 56 extending from front to rear of the frame and connected to the cross braces 54 are provided, these angles overlying the bearings and giving them ample support. The crank shaft 52 at one side of the frame is extended as at 57 and provided with an operating handle 58. In the rocking of the crank shaft 52, it will be obvious that the crank thereof and the connecting rod 51 acts as a toggle, which when the connecting points are in alinement, exert maximum pressure through the plunger 44.

From the foregoing description, it will be obvious that the mold may be moved outwardly on the guide rails 25 to permit the highly polished plate 31 to receive its proper coating of color mix as previously described and thereafter its plastic backing as of a cement and sand mixture, after which the lever 41 which has been depressed to effect outward movement of the mold, is raised to the position shown in Figure 18, thereby moving the mold back to engage the stops 42 in cooperating relation to the mold plunger 43. This plunger which of course has been raised during the filling operation of the mold is now depressed through the hand lever 58 at the top of the machine and its associated operating parts. After the proper amount of pressure has been employed, the lever 58 is reversely moved to lift the plunger, and it is now necessary to remove the side mold section 32 in order that the molded tile resting on the plate 31 may be removed from the mold.

In accordance with the present invention, the lifting of the side mold section is mechanically accomplished while the mold remains in its inner molding position with the plunger, of course, upraised. To effect this result, a metal spider having arms 59 alined with the vertical bores 29 in the mold base is guided for movement through said bores to engage and lift the side mold section 32 by a plurality of apertured guide fingers 60 secured to the underside of the centrally located cross braces 23 and by a lower guide 61 secured to the frame members and centrally apertured to receive the shank 62 of the spider from which the arms 59 radiate. The shank 62 is reduced in diameter intermediate its ends forming a stop shoulder which rests upon the upper side of the guide 61 to position the mold section, leaving the fingers just below the mold base with the upper ends of the fingers extended through and engaged by the guide fingers 61. Spaced links 63 connect the lower end of this mold lifting spider with a rock shaft 64 mounted at the base of the frame in suitable bearings and pivotally connected to the lower end of a vertically extending rod 69 (Fig. 14) whose bifurcated upper end is pivoted to the short arm 70 of a bell crank, the long arm 71 of which forms an operating lever and is positioned at the left side of the frame adjacent to the mold guides 25, while the lever 41 for moving the mold inwardly and outwardly is positioned at the right side of the frame.

When the tile of the other block has been molded as described, it will be obvious, thereby, that operation of the lever 71 will be effective through the arm 59 to lift the side section of the mold upwardly thereby permitting the operator of the machine to grasp the highly polished plate 31 upon which the tile has been molded and lift the same from the machine. The plate may then be given a sharp bunt against a suitable abutment such as the frame attached arm 72, the concussive force imparted by the blow causing the tile to be loosened on the plate and causing the plate automatically to effect the trowelling action heretofore described. In the outdrawn position of the mold for filling, the color mix is first applied over the plate and thereafter the backing of plastic material such as the usual wet concrete and sand mixture is applied. Surplus material in either of these operations, and particularly in the application of the color mix, is cast in the trough 27 out of the way and caught by a suitable receptacle hung beneath the trough as suggested in Figure 14 of the drawings.

From the foregoing, it will be seen that the described mold press is especially adapted for use in the practice of the method of molding tile and other similar articles which has been described in detail heretofore, and while adapted for this particular use, it is nevertheless susceptible of change in form and structure within the spirit of the invention and the scope of the appended claims.

Having described my invention, what I claim and desire to secure by Letters Patent is:

1. A machine of the character described comprising in combination, a frame, a pressure applying plunger mounted therein for reciprocating movement and a cooperating mold support mounted thereon and guided for rectilinear movements in a plane substantially at right angles to the plane of plunger movement and from a filling position out of line with the plunger to a pressure receiving position alined with said plunger, and manually operable means for effecting such rectilinear movement of the mold support.

2. A machine of the character described comprising in combination, a frame, a pressure applying plunger mounted therein for reciprocating rectilinear movement, and a cooperating mold support mounted thereon and guided for rectilinear movement in a plane substantially at right angles to the plane of plunger movement and from a filling position beyond the plane of plunger movement into said plane and in alinement with the plunger, manually operable means for effecting such movement of the mold support, with means to arrest movement of the mold when said plane of plunger alinement is reached.

3. In a machine of the character described, a frame, a reciprocating plunger therein, a mold support mounted on said frame and guided for movement in a plane substantially at right angles to the plane of plunger movement to and from alinement with said plunger, manually operable means for so moving said support, a separable mold base and side walls determinately positioned thereon and means operative when plunger and mold are alined with the plunger in raised non-pressing position for lifting the side walls relatively to the base.

4. A machine of the character described comprising in combination, a frame, a pressure applying plunger mounted therein for rectilinear reciprocating movement, a cooperating mold support mounted on said frame and guided for bodily rectilinear movements in a plane substantially at right angles to the plane of movement of said plunger and from a mold filling position to a pressure receiving position determinately alined with said plunger, manually operable means for so moving said mold support, a mold having a base and a relatively movable side wall section determinately positioned on the mold support and means operable to lift and support the side wall section of the mold in the alined position of mold and plunger with the plunger in raised non-pressing position to permit removal of the molded product and thereafter operable to re-position the side walls on the mold support.

5. A machine of the character described having, in combination, a frame, a pressure applying plunger mounted therein for reciprocation, a cooperating mold support mounted therein and guided for movement in a plane substantially at right angles to the plane of plunger movement to and from a pressure receiving position alined with the plunger, manually operable means for so moving the mold support, a mold face plate mounted on said support, mold sides mounted thereover in alinement with the plunger for movement toward and from said face plate, and manually operable means operative in the plunger alined position of the mold with the plunger in raised non-pressing position to lift and support said sides above the plate to permit the mold face plate and the molded product resting thereon to be removed.

6. A machine of the character described having in combination, a frame, a plunger mounted therein for reciprocation, a mold support guided for movement in a plane substantially at right angles to the plane of plunger movement toward and from a predetermined position alined with said plunger, a mold including a base and a determinately positioned, relatively movable, side mold section normally resting on said base, but guided for movement toward and from said base, means for moving said mold support bodily to and from said alined position, means operative to effect bodily guided movement of the side mold section relatively to and from said base, said base cooperating with said means in the alined positions of the base and plunger, only, to permit said bodily guided movement.

7. A machine of the character described having, in combination, a frame, a pressure applying plunger mounted therein for reciprocation, a cooperating mold mounted on said frame for movement to and from a pressure receiving position alined with the plunger, said mold comprising a base having guide openings therethrough, and a relatively movable side wall section mounted on said base and positioned over said openings, a mold separating member having a plurality of mold engaging arms alined with the guide openings in the mold base in the plunger alined position thereof, and means for positioning the mold in pressure receiving alinement with the plunger and with its guide openings alined with said plurality of arms whereby the mold sides may be lifted by said arms when the plunger is lifted to non-pressing position and the molded product made accessible for removal.

8. A machine of the character described having, in combination, a frame, a pressure applying plunger mounted therein for reciprocation in a substantially vertical plane, a cooperating mold mounted on the frame for movement in a substantially horizontal plane to and from a filling position to a plunger alined pressure receiving position and comprising a base member having a plurality of guide openings therethrough positioned beyond the area of molding action, a metal mold face plate on said base within the area defined by said guide openings and a side wall mold section seated over said plate and extending over the guide openings, a spider mounted in the frame below the mold for vertical reciprocating movement, and having a plurality of arms guided to enter through the guide openings in the mold base to lift the side wall mold section thereabove when the mold is positioned in alinement with the plunger and the plunger is raised to non-pressing position, and means by which the mold is so positioned.

9. A machine of the character described having in combination, a frame, a reciprocating pressure applying plunger and a reciprocating mold separating member in opposed relation at opposite ends of the frame, and a separable mold mounted on the frame intermediate of the said plunger and separator member for movement toward and from a position therebetween and in operative alinement therewith, said mold comprising an apertured base and a relatively movable side section seated thereover aligned with the apertures in said base and positioned in line with and in operative relation to the separator member when the mold is in alinement with said plunger, said separator member having portions alined with the apertures in said base to project therethrough and lift the mold when the plunger is in raised non-pressing position.

GEORGE B. STEAD.